(12) United States Patent
Akanbi et al.

(10) Patent No.: US 8,588,607 B2
(45) Date of Patent: Nov. 19, 2013

(54) DISPERSION SCHEME FOR PHYSICAL LAYER DIAGNOSIS IN BI-DIRECTIONAL DUAL-FIBER OPTICAL NETWORKS

(75) Inventors: Oladeji Bamidele Akanbi, Houston, TX (US); Jerry G. Aguren, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 12/362,484

(22) Filed: Jan. 29, 2009

(65) Prior Publication Data

US 2010/0189434 A1   Jul. 29, 2010

(51) Int. Cl.
*H04B 10/00* (2013.01)

(52) U.S. Cl.
USPC ............... 398/25; 398/29; 398/143; 398/147; 398/158; 398/159

(58) Field of Classification Search
USPC ............................ 398/29, 147, 158–159, 143
See application file for complete search history.

(56) References Cited

U.S. PATENT DOCUMENTS

| | | | | | |
|---|---|---|---|---|---|
| 3,697,757 | A | * | 10/1972 | Stone | 398/32 |
| 4,637,072 | A | * | 1/1987 | Hellstrom | 398/29 |
| 5,469,287 | A | * | 11/1995 | Iwakuni | 398/202 |
| 2001/0008533 | A1 | * | 7/2001 | Umayabashi | 370/468 |
| 2003/0002098 | A1 | * | 1/2003 | Carrick et al. | 359/110 |
| 2003/0099014 | A1 | * | 5/2003 | Egner et al. | 359/124 |
| 2004/0151495 | A1 | * | 8/2004 | Knox et al. | 398/25 |
| 2007/0248362 | A1 | * | 10/2007 | Tanaka et al. | 398/189 |
| 2008/0112709 | A1 | * | 5/2008 | Oulianov et al. | 398/159 |

* cited by examiner

*Primary Examiner* — Jessica Stultz
*Assistant Examiner* — Michael Carter

(57) ABSTRACT

Methods, systems, and computer program products are provided for measuring modal dispersion in a bi-directional dual-multimode fiber optic network (BDON). A modal dispersion measurement system includes a computer processor that is programmed to receive a first pulse width of a first pulse. The first pulse may be communicated over the BDON that is coupled to the processor. A second pulse width of a second pulse is received, the second pulse width being indicative of the modal dispersion. The second pulse width and the first pulse width are compared by the computer processor to determine a distortion error. A measurement of the modal dispersion is validated in accordance to the distortion error.

23 Claims, 5 Drawing Sheets

DISPERSION SCHEME FOR PHYSICAL LAYER DIAGNOSIS IN BI-DIRECTIONAL DUAL-FIBER OPTICAL NETWORKS

BACKGROUND OF THE INVENTION

The exponential growth in the demand for higher bandwidths and increased data transfer rates has accelerated the deployment of optical networks in building a communication infrastructure. An optical fiber is typically fabricated from glass or plastic that is capable of propagating light or an optical signal (in the form light pulses) along its length with little attenuation compared to wired or wireless media, thereby enabling the signal to travel over longer distances and at higher bandwidths.

An optical fiber may be typically classified into two types—a single mode fiber (also referred to as a monomode fiber) and a multimode fiber. A single mode optical fiber typically restricts the propagation of light along the fiber core to a single mode (or transmission path), and a multimode fiber is a fiber that supports the simultaneous propagation of multiple modes (or transmission paths) since it has a larger core diameter compared to the optical wavelength as well as the single mode optical fiber. That is, a multimode fiber is an optical fiber that is designed to carry multiple light rays concurrently, each at a slightly different reflection angle relative to the axis of the optical fiber core. Multimode fiber transmission is typically used for applications covering relatively short distances because the modes tend to disperse over longer lengths, thereby causing signal distortion (this phenomenon is referred to as modal dispersion). Specifically, modal dispersion is the temporal spreading of the bits due to varying paths and arrival times of the pulses at the end of the fiber. Modal dispersion adversely affects the bandwidth carrying capacity of the network. The distortion is caused as a result of the propagation velocity of the optical signal being different for all modes (or paths) within the multimode fiber. A single mode fiber may be used for communications over longer distances.

BRIEF DESCRIPTION OF THE DRAWINGS

Embodiments of the invention relating to both structure and method of operation may best be understood by referring to the following description and accompanying drawings.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a length of a fiber optic network may be configured to be equal to 2 kilometers.

Dispersion measurement systems and methods are disclosed herein that enable a user to detect in an on-line manner signal distortions in a multimode fiber optic network caused by modal dispersion. Detection of transmission errors or degradation of signal caused by exceeding specified maximum transmission distances for fiber optic media can be a challenge. Previous systems and methods for measuring signal degradation due to modal dispersion generally involve placing the fiber optic network off-line, sending a short pulse from a transmitter located at a sending end, measuring the width of the short pulse at a receiver located at a receiving end, and analyzing the data (collected at the receiving and sending ends) to determine if signal quality is acceptable. However, the technique used for modal dispersion measurement is prone to errors due to factors such as measurement of miniscule power changes caused due to a change in length for the multiple paths, presence of noise, jitter, and similar other factors. The systems and methods disclosed herein monitor the fiber optic network operating in an on-line mode without having to place the network in a test or a diagnostic mode.

Figure 1A:
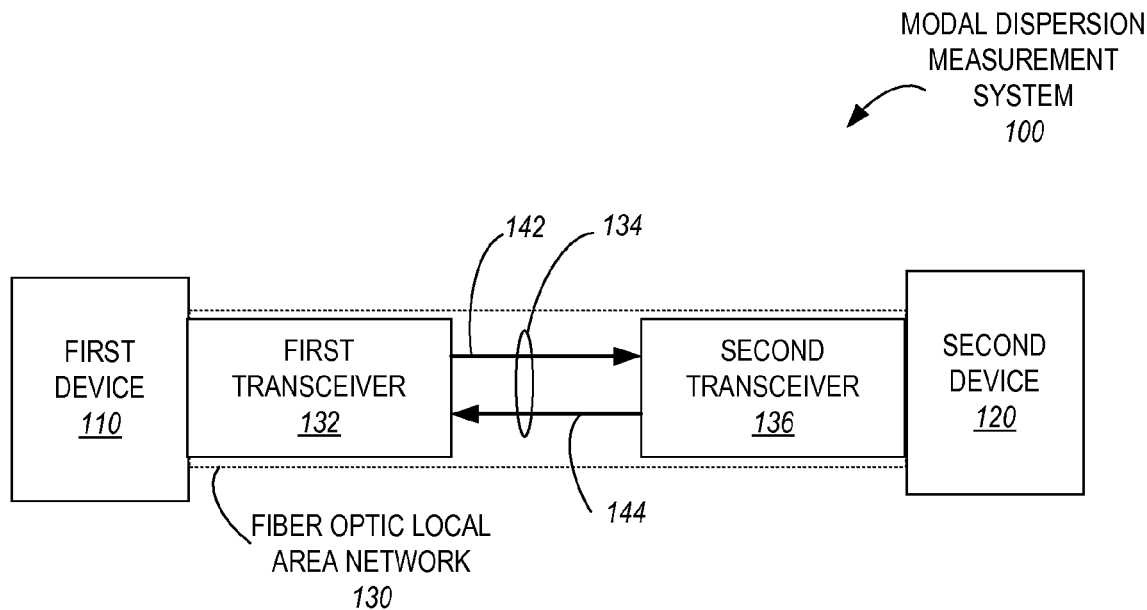
FIG. 1A illustrates a modal dispersion measurement system, according to an embodiment.

FIG. 1A illustrates a modal dispersion measurement system 100, according to an embodiment. The modal dispersion measurement system 100 includes a first device 110 communicatively coupled to a second device 120 by a fiber optic local area network (LAN) 130. The fiber optic local area network (LAN) 130 may be configured to comply with well known fiber optic public or proprietary standards such as FDDI, SONET, PON, Gigabit Ethernet, Fiber Channel, and/or others. The fiber optic LAN 130 includes a first transceiver 132 coupled to the first device 110, a bi-directional dual-multimode fiber optic network (BDON) 134, and a second transceiver 136 coupled to the second device 120. A transceiver 132, 136 combines the functions of a transmitter and a receiver into one device. The BDON 134 includes a send optical channel and a receive optical channel. That is, the BDON 134 includes a first optical channel 142 that propagates optical signals in one direction, e.g., from the first device 110 to the second device 120, and a second optical channel 144 that propagates optical signals in a opposite direction, e.g., from the second device 120 to the first device 110 in a direction opposite to that of the first optical channel 142.

Figure 1B:
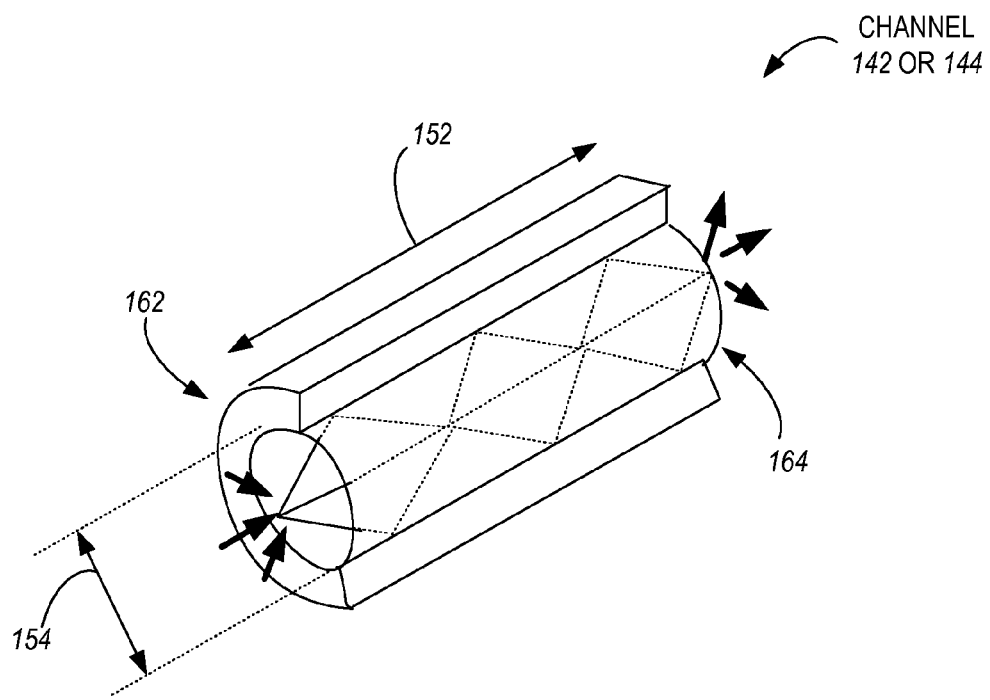
FIG. 1B illustrates a cross sectional view of an optical channel of a bi-directional dual-multimode fiber optic network (BDON) described with reference to FIG. 1A, according to an embodiment.

FIG. 1B illustrates a cross sectional view of an optical channel of a BDON, according to an embodiment. Channels 142 and 144 of the BDON 134 are a multimode optical fiber having a length L 152 and a core diameter D 154. Three exemplary signals are shown entering a first end 162 with each signal having a different reflection angle relative to an axis of the core. The three signals are propagated along three different paths and exit at a second end 164. Signals propagating via the BDON 134 are subject to the modal dispersion phenomenon that causes signal distortion. That is, characteristics of a signal received at the first end 162 of the BDON 134 and characteristics of a signal received at the second end 164 that is opposite to the first end 162 of the BDON 134 may be different due to the presence of modal dispersion effects in the BDON 134.

Referring to FIGS. 1A and 1B, the first transceiver 132 and the second transceiver 136 may be implemented as small factor pluggable (SFP) transceivers. The SFP is a widely accepted industry format that is supported by several fiber optic component vendors. The SFP is a compact, hot-pluggable optical transceiver deployed in optical communication applications including telecommunication and data communications. It interfaces a network device printed circuit board (for a switch, router, or similar device including devices 110 and 120) to a fiber optic networking cable. The SFP also provides a monitoring feature that enables an end user to monitor real-time parameters of the SFP, such as optical output power, optical input power, temperature, laser bias current, and transceiver supply voltage. Additional details of the first transceiver 132 and the second transceiver 136 are described with reference to FIG. 3.

Referring back to FIGS. 1A and 1B, the modal dispersion measurement system 100 is operable in one of a plurality of operating modes such as on-line, off-line, startup, test, powered off, and several others. The on-line operating mode is typically the normal operating mode in which the first device 110 is exchanging desired data with the second device 120 via the fiber optic LAN 130. The modal dispersion measurement system 100 is configured to facilitate on-line data exchange between the first device 110 and the second device 120 via the fiber optic LAN 130 by complying with one or more communication standards or protocols. Thus, communication signals (in the form of light pulses) exchanged on-line between first device 110 and the second device 120 conform to a common structure and format, e.g., synchronous or asynchronous bit stream data communication, structure and size of a frame or packet of data, format for the frame, and similar others. Additional details of the light pulse signals exchanged within the modal dispersion measurement system 100 are described with reference to FIG. 2.

Figure 2:
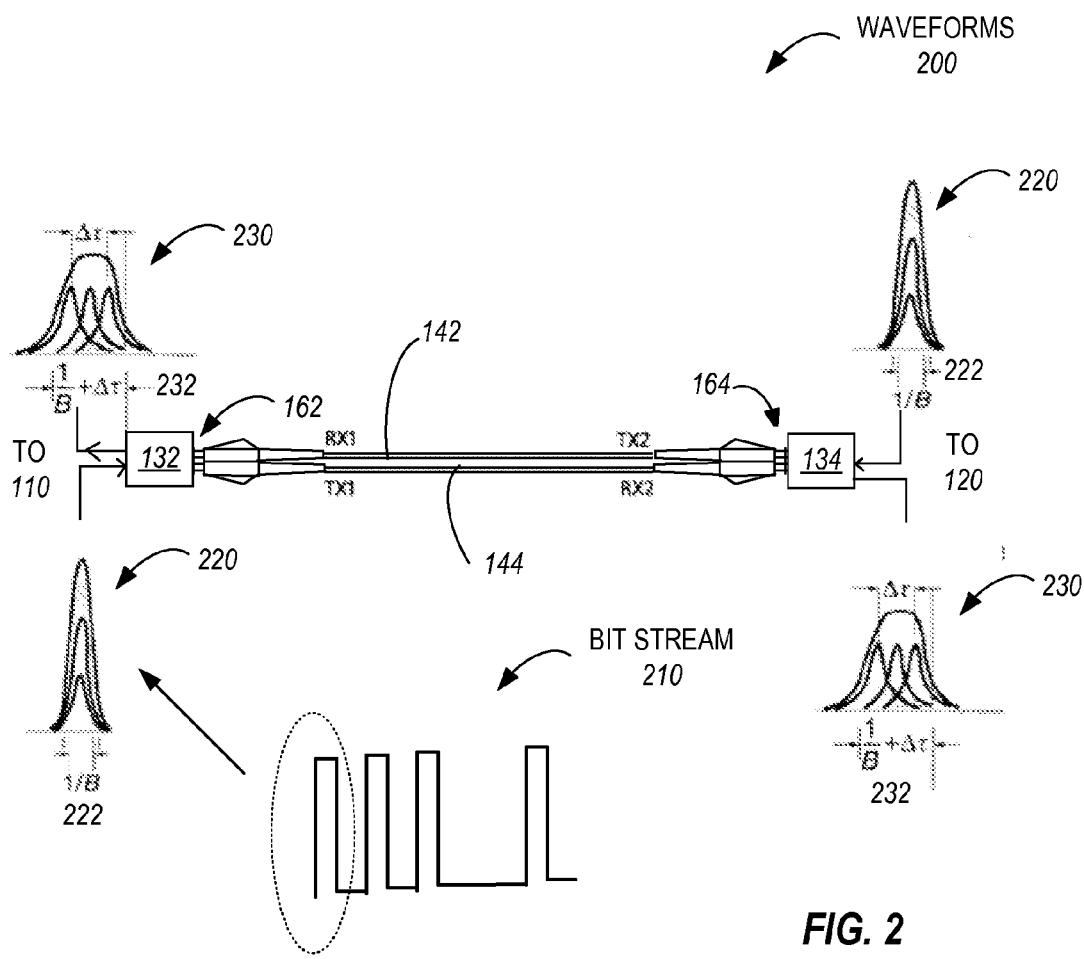
FIG. 2 illustrates waveforms associated with communication signals exchanged within a modal dispersion measurement system described with reference to FIGS. 1A and 1B, according to an embodiment.

FIG. 2 illustrates waveforms 200 associated with communication signals exchanged within the modal dispersion measurement system 100, according to an embodiment. As described earlier, communication signals (in the form of light pulses) exchanged on-line between the first device 110 and the second device 120 conform to a common structure and format. The waveforms 200 may include a plurality of pulses forming a bit stream 210 of data. The structure and format define the relevance and define a particular sequence of information exchanged between the two devices. The structure and format may be defined by using a public or proprietary protocol. That is, the first device 110 and the second device 120 generate the bit stream 210 having a known syntax for the on-line exchange of information.

A bit stream is simply a time series of bits (e.g., having a logic 1 or 0 state as a function of time). In a digital communication system, information is generally transmitted between systems in the form of coded bit streams, which may typically represent audiovisual or other generic data. In order to be usable by the receiving system, such coded bit streams are first decoded and then parsed, e.g., separated into semantically meaningful units or 'objects'. For example, in the case of an MPEG-4 encoded bit stream, the bit stream is parsed into slices and macroblocks before the information contained in the bit stream is usable by an MPEG-4 decoder. The MPEG-4 decoder uses the parsed bit stream to reconstruct the original audiovisual information.

Bit streams such as the bit stream 210 may be of a fixed format or may be of a programmable format. In fixed format bit streams, the parsing operation is typically performed by custom-manufactured hardware, software or a combination thereof. Such customized bit stream parsers are pre-programmed to separate an incoming bit stream based on some pre-selected objective rules or criterion, such as the intrinsic characteristics of packets of information in the bit stream, or transitions in the characteristics between consecutive packets of information. However, in some applications, flexibility may be a problem with a fixed format bit stream parser since the parsing rules are inflexible to changes in the syntax of the incoming bit stream. A programmable bit stream provides flexibility in parsing. That is, bit stream parsers are 'programmable' to accommodate various bit streams having differing syntax. Bit streams having different syntax can be accepted by the same parser by simple reprogramming, rather than replacing, the parser.

An amplitude of the first pulse 220 may vary in dependence of an angle of reflection with the amplitude being the highest for a signal path aligned with the axis of the optical fiber core. The second pulse 230 is shown to include 3 component pulses received from 3 paths resulting in a composite pulse having a pulse width equal to the second pulse width 232. It is understood that a number of component pulses present in the second pulse 230 may depend on various factors such as a diameter of the core of the optical fiber.

The second pulse width 232 is different than the first pulse width 222 due to the signal distortion caused by modal dispersion within the BDON 134. Thus, a difference between the second pulse width 232 and the first pulse width 222 is indicative of the distortion error. The distortion error may be used to validate the BDON 134, e.g., verify whether the BDON 134 is operating in a normal, on-line operating mode and the signal distortion due to modal dispersion is within desired limits.

An amplitude of the first pulse 210 may vary in dependence of an angle of reflection with the amplitude being the highest for a signal path aligned with the axis of the optical fiber core. The second pulse 230 is shown to include 3 component pulses received from 3 paths resulting in a composite pulse having a pulse width equal to the second pulse width 232. It is understood that a number of component pulses present in the second pulse 230 may depend on various factors such as a diameter of the core of the optical fiber.

The first pulse 220 may be selected to be any one pulse from the bit stream 210, e.g., a first pulse in the sequence. The identification and selection of the second pulse 230 from a bit stream flowing in an opposite direction is in accordance to the selection of the first pulse 220 from a bit stream flowing in one direction. That is, if the first pulse 220 is selected to be the first pulse or the starting pulse in the sequence within the bit stream then the second pulse 232 is also the first pulse or the starting pulse in the sequence of bits being received from the opposite end. Both the first pulse 220 and the second pulse 230 are received by at least one of the first transceiver 132 and the second transceiver 136. That is, measurement of the pulse widths may be performed by a single transceiver located on one end of the BDON 134 or may be performed by two transceivers (a corresponding transceiver located at each end of the BDON 134).

Figure 3:
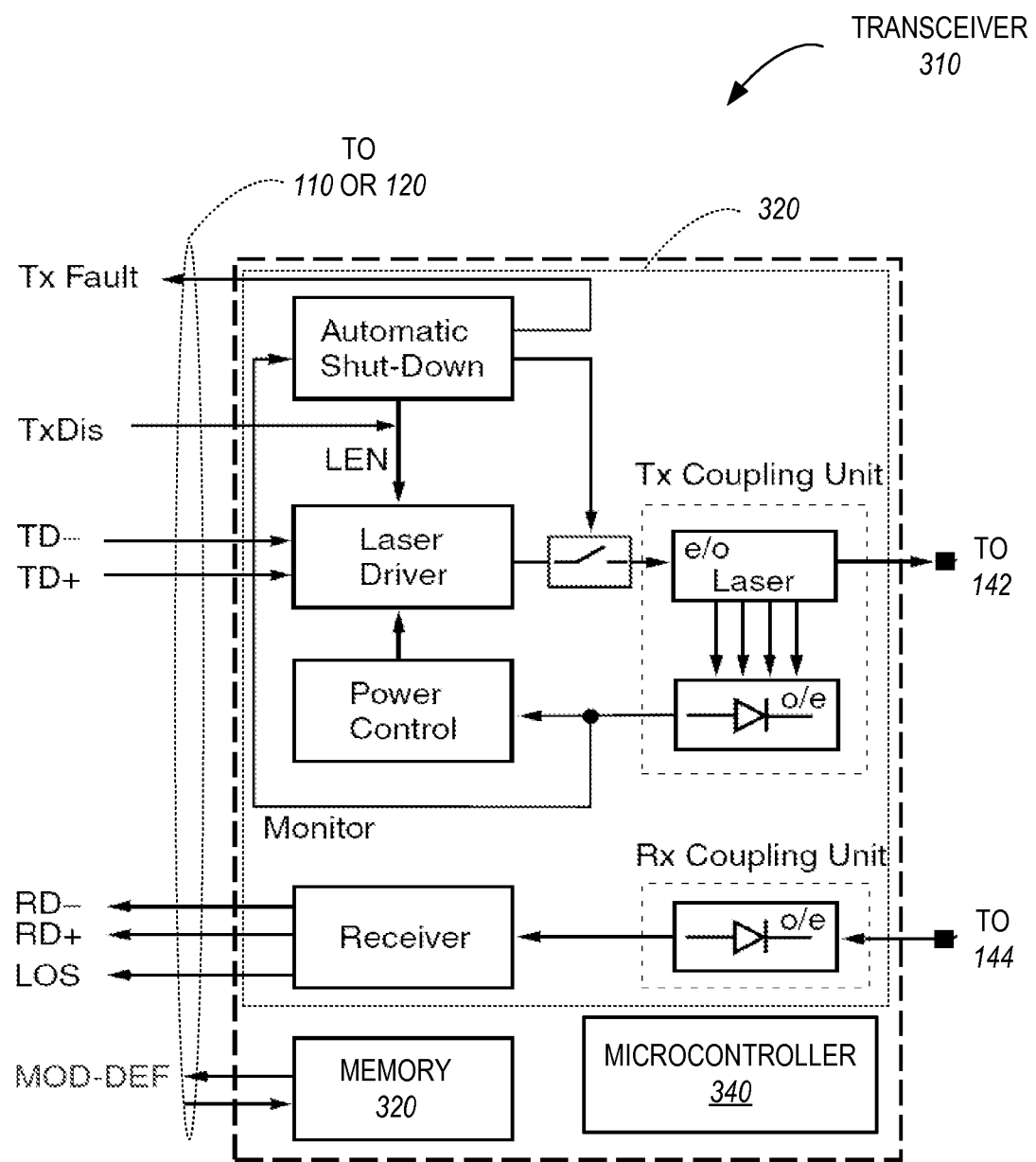
FIG. 3 is a block diagram illustrating additional details of a transceiver described with reference to FIG. 1A, according to an embodiment.

FIG. 3 illustrates a block diagram of a transceiver described with reference to FIG. 1A, according to an embodiment. A transceiver 310 may be used to implement the first transceiver 132 and the second transceiver 136 described with reference to FIG. 1A. The transceiver 310 includes receiver and transmitter circuits 320, a memory 320, and a microcontroller 340.

The receiver and transmitter circuits 320 are operable to receive and transmit communication signals between a network device, e.g., the first device 110 and the second device 120, and a multimode fiber, e.g., the BDON 134. The memory 330 is operable to store data, e.g., bit stream and timing data, and other monitored data like supply voltage, transmitter bias current, and transmitter output power. The microcontroller 340 is operable to control the operation of the receiver and transmitter circuits 320 and the memory 320 by controlling the flow of data, e.g., data included in the bit stream 210, flowing through the transceiver 310.

Using the data stored in the memory 330 and other real-time data flowing through the transceiver 310, the microcontroller 340 may be used to compute distortion error and determine whether a performance of the BDON 134 is normal or has degraded beyond acceptability. The performance of the BDON 134 may be computed by the following equations:

$$BW_{optimal} = (BW*D)/L_{max} \quad \text{Equation 302}$$

$$BW = (SQRT(0.3*\ln 10))/(2*\pi*\Delta\tau_{fiber}) \quad \text{Equation 304}$$

$$\Delta\tau_{fiber} = SQRT(\tau^2_{out} - \tau^2_{in}) \quad \text{Equation 306}$$

$$\tau_{in} = 1/B \quad \text{Equation 308}$$

where BW.sub.optimal is the optimal bandwidth of the fiber; BW is the bandwidth of the signal; D is the diameter of the core of the fiber; deltaTau.sub.fiber is the distortion error measured as a pulse spread due to modal dispersion; Tau.sub..out is the second pulse width 232; Tau.sub.in is the first pulse width 222; and B is the bit rate of the signal.

A bandwidth BW of a signal propagating through the BDON 134 fiber is computed by using Equations 304 and 306. Using Equation 302, BW.sub.optimal may be computed since BW*D and L.sub.max are known for a given bit rate. If BW is less than or equal to BW.sub.optimal then the length L 152 of the BDON 134 is less than the allowable maximum L.sub.max length and the modal dispersion measurement system 100 is validated to be working normally, e.g., the distortion error is within allowable threshold limits. If BW is greater than BW.sub.optimal then the length L 152 of the BDON 134 is greater than the allowable maximum L.sub..max length and the modal dispersion measurement system 100 is validated to be not working normally, e.g., the distortion error exceeds the allowable threshold limits. The configuration of the allowable threshold limits, e.g., 1% allowable distortion error, may be application dependent and may depend on the difference between L 152 and L.sub.max.

Faults occurring within any one of the channels of the BDON 134 may be detected in real-time without having to place the BDON 134 in an off-line or a diagnostic mode. For example, two consecutive BW values of the BDON 134 may be stored. If a fault occurs on any one channel of the BDON 134 then a difference between the two consecutive BW values is greater than a threshold.

Figure 4:
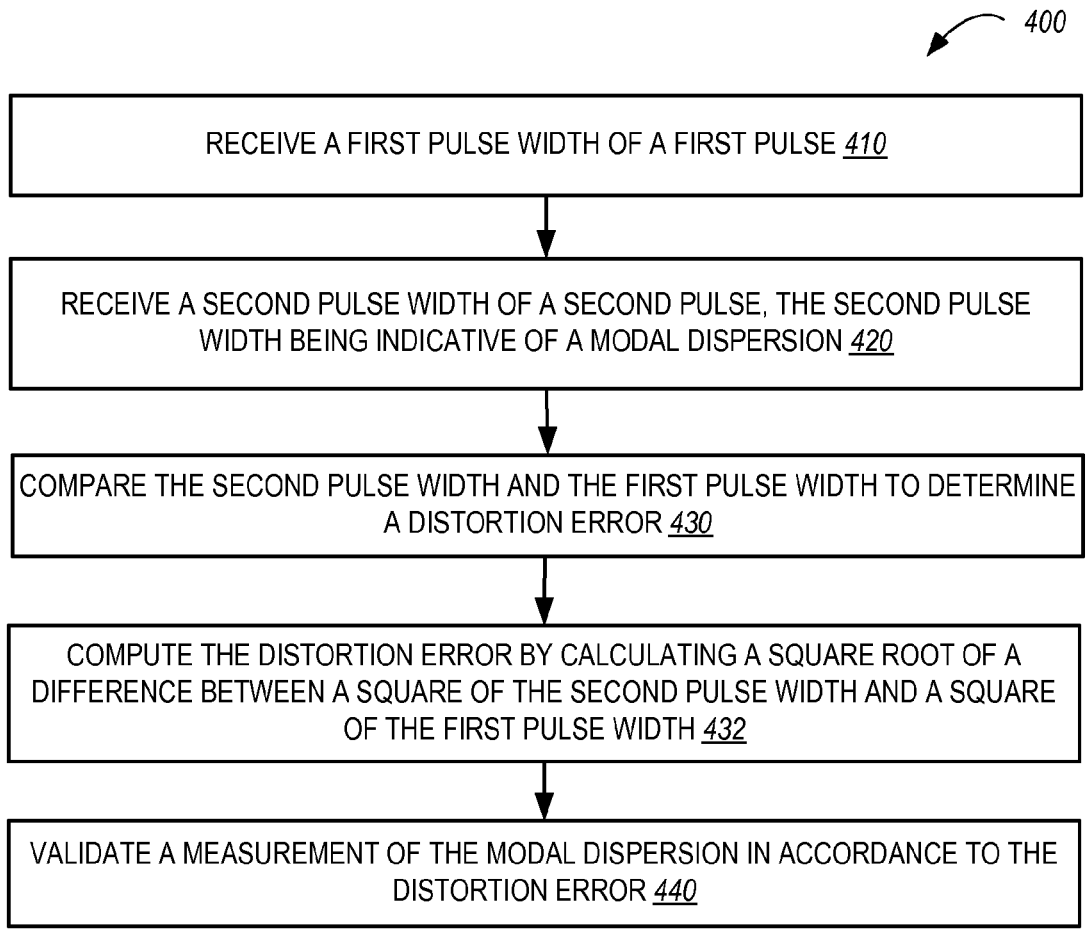
FIG. 4 is a flow chart of a method for measuring modal dispersion, according to an embodiment.

FIG. 4 is a flow chart of a method 400 for measuring modal dispersion, according to an embodiment. In a particular embodiment, the method is used for measuring modal dispersion using the modal dispersion measurement system 100 described with reference to FIGS. 1A, 1B, 2, and 3.

At process 410, a first pulse width of a first pulse is received. The first pulse may be communicated over a bi-directional dual-multimode fiber optic network (BDON) that causes the modal dispersion. At process 420, a second pulse width of a second pulse, which may be communicated over the BDON, is received, the second pulse width being indicative of the modal dispersion. At process 430, the second pulse width and the first pulse width are compared to determine a distortion error. At process 440, the measurement of the modal dispersion is validated in accordance to the distortion error. Validation may include determining if the modal dispersion measurement system 100 is operating normally within the desired threshold limits of the distortion error.

It is understood, that various steps described above may be added, omitted, combined, altered, or performed in different order. For example, processes may be added to compute the distortion error. At process 432, the distortion error is computed by calculating a square root of a difference between a square of the second pulse width and a square of the first pulse width.

Figure 5:
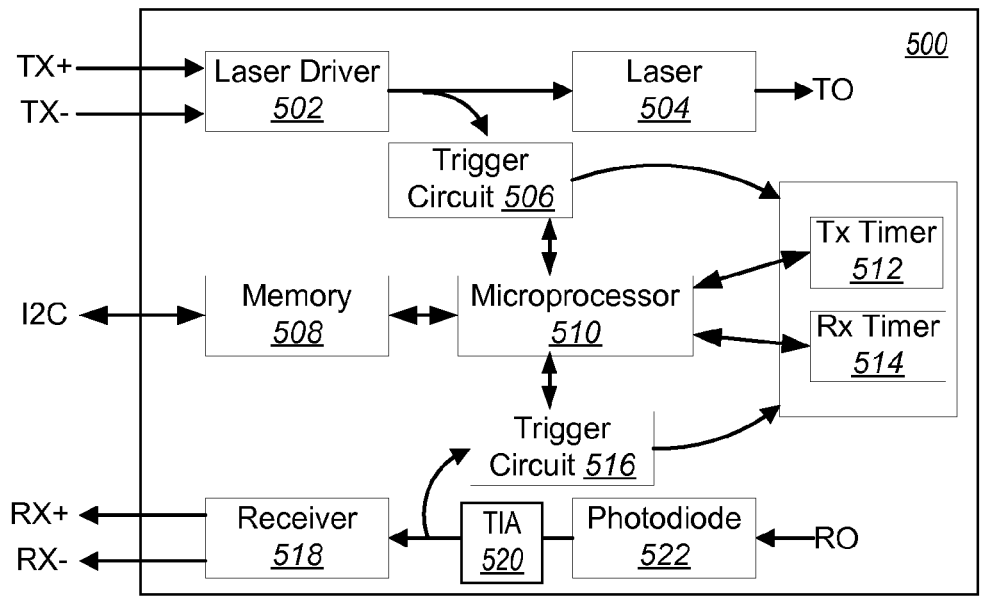
FIG. 5 is a block diagram illustrating additional details of a transceiver described with reference to FIG. 1A, according to an embodiment.

FIG. 5 illustrates a block diagram of a transceiver 500 described with reference to FIG. 1A, according to an embodiment. Transceiver 500 may be used to implement the first transceiver 132 and the second transceiver 136 described with reference to FIG. 1A. The transceiver 500 includes laser driver 502, laser 504, trigger circuit 506, memory device 508, microprocessor 510, transmit timer 512, receive timer 514, trigger circuit 516, receiver 518, and photodiode 522. Laser driver 502 and laser 504 generate transmit data, while photodiode 520 detects incoming optical signals that are supplied to receiver 518. A transimpedance amplifier 520 can be included between photodiode 522 and receiver 518 to condition the received signals for receiver 518.

Transceiver 500 is operable to receive and transmit communication signals between a network device, e.g., the first device 110 and the second device 120, and a multimode fiber, e.g., the BDON 134. Memory 508 is operable to store data, e.g., bit stream and timing data, and other monitored data such as supply voltage, transmitter bias current, and transmitter output power. The microprocessor 510 is operable to control the operation of transceiver 500 by controlling the flow of data, e.g., data included in the bit stream 210, flowing through the transceiver 500.

Trigger circuits 506, 516 receive input from respective laser driver 502 and receiver 518, and send output to respective transmit timer 512 and receive timer 514. Trigger circuits 506, 516 also communicate with microprocessor 510.

Using the data stored in the memory 508 and other real-time data flowing through the transceiver 500, the microprocessor 510 may be used to compute distortion error and determine whether a performance of the BDON 134 is normal or has degraded beyond acceptability. The performance of the BDON 134 may be computed using equations 302-308 presented hereinabove.

Faults occurring within any one of the channels of the BDON 134 may be detected in real-time without having to place the BDON 134 in an off-line or a diagnostic mode. For example, two consecutive BW values of the BDON 134 may be stored. If a fault occurs on any one channel of the BDON 134 then a difference between the two consecutive BW values is greater than a threshold.

Figure 6:
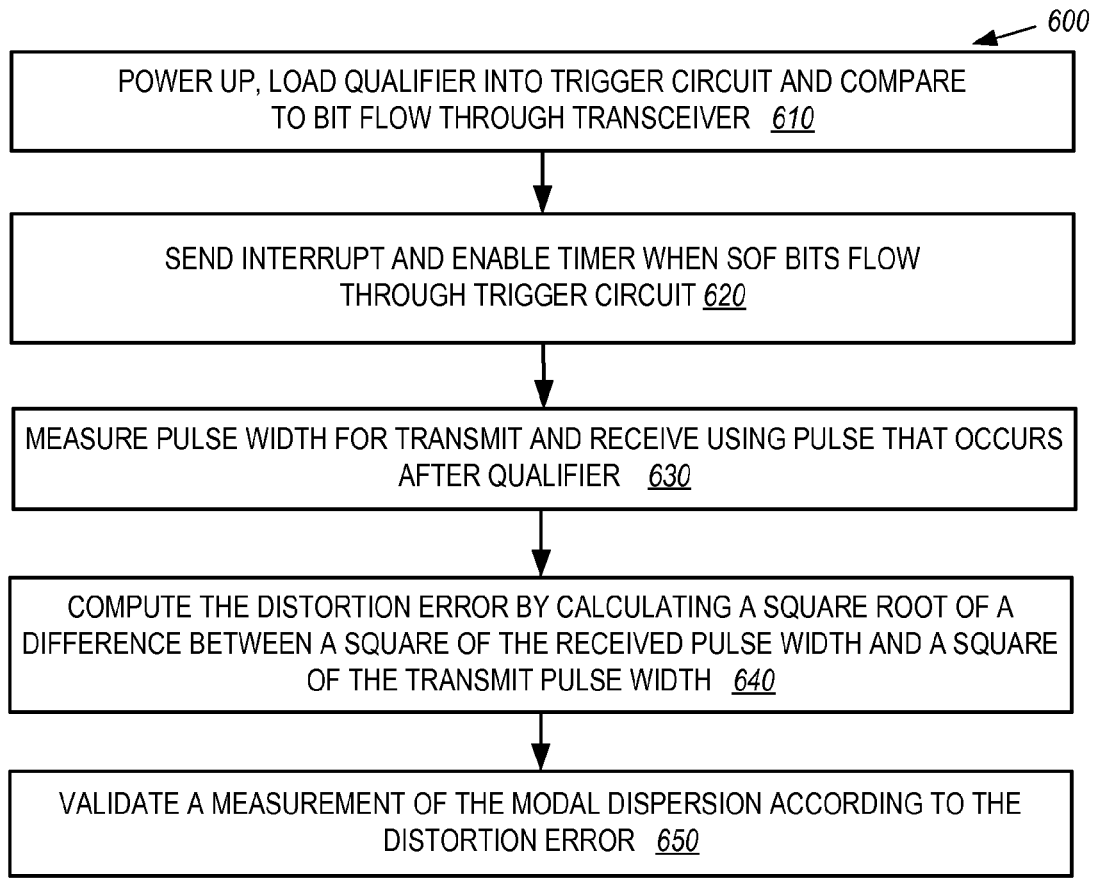
FIG. 6 is a flow chart of a method for measuring modal dispersion, according to an embodiment.

FIG. 6 is a flow chart of a method 600 for measuring modal dispersion, according to an embodiment. Method 600 can be implemented in transceiver 500 (FIG. 6) and can be used with any optical protocol. In a particular embodiment, method 600 can be used for measuring modal dispersion using the modal dispersion measurement system 100 described with reference to FIGS. 1A, 1B, 2, and 5.

During power-up, process 610 loads qualifier values into trigger circuits 506, 516. The qualifier values may be stored in memory 508 and communicated to trigger circuits 506, 516 via microprocessor 510. Trigger circuits 506, 516 compare the qualifier values to normal operational signals through transceiver 500. The signals may be communicated over a bi-directional dual-multimode fiber optic network (BDON) that causes the modal dispersion. The qualifier values are a subset of bits defined in the Fibre Channel protocol's start of frame (SOF), which signals the beginning of a frame of data. When the SOF bits flow through the trigger circuits 506, 516, process 620 sends an interrupt to the microprocessor 510 and the transmit timer 512 and receive timer 514 are enabled. After the qualifier values are detected, process 630 measures the pulse width for both the transmit and receive optics using a pulse that consistently occurs after the qualifier value. Process 640 calculates the modal dispersion based on the square root of the difference between the receive pulse squared and the transmit pulse squared.

At process 650, the measurement of the modal dispersion can be validated according to the distortion error. Validation may include determining if the modal dispersion measurement system 100 is operating normally within the desired threshold limits of the distortion error.

It is understood, that various steps described above may be added, omitted, combined, altered, or performed in different order. For example, processes may be added to compute the distortion error.

Figure 7:
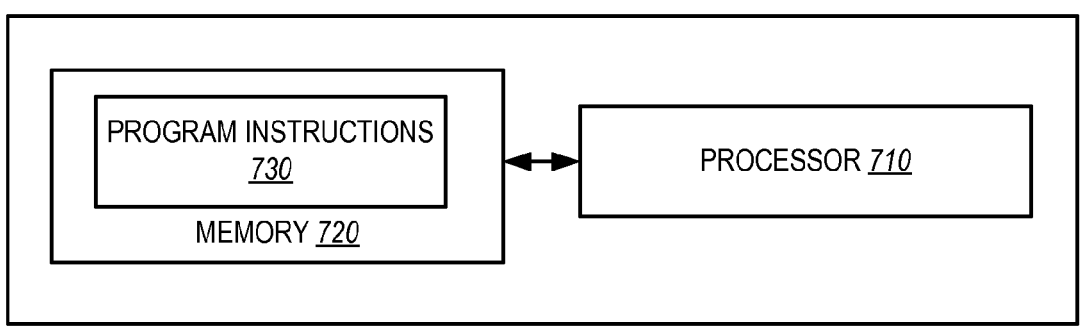
FIG. 7 illustrates a block diagram of a computer system, according to an embodiment.

FIG. 7 illustrates a block diagram of a computer system 700, according to an embodiment. The computer system 700 includes a processor 710 coupled to a memory 720. The memory 720 is operable to store program instructions 730 that are executable by the processor 710 to perform one or more functions. It should be understood that the term "computer system" is intended to encompass any device having a processor that is capable of executing program instructions from a memory medium. In a particular embodiment, the various functions, processes, methods 400, 600, and operations described herein may be implemented using the computer system 700. For example, the modal dispersion measurement system 100 and components thereof, e.g., the first transceiver 132 and the second transceiver 136, may be implemented using one or more of the computer system 700.

The various functions, processes, methods, and operations performed or executed by the system 700 can be implemented as the program instructions 730 (also referred to as software or simply programs) that are executable by the processor 710 and various types of computer processors, controllers, microcontrollers, central processing units, microprocessors, digital signal processors, state machines, programmable logic arrays, and the like. In an exemplary, non-depicted embodiment, the computer system 700 may be networked (using wired or wireless networks) with other computer systems.

In various embodiments the program instructions 730 may be implemented in various ways, including procedure-based techniques, component-based techniques, object-oriented techniques, rule-based techniques, among others. The program instructions 730 can be stored on the memory 720 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Embodiments disclosed herein provide a modal dispersion measurement system that is operable to make on-line measurements while normal data communication takes place through the fiber optic network. That is, there is no need to place the fiber optic network in an off-line mode to conduct testing for diagnosing modal dispersion errors. The measurements may be made on one end or on both ends of a multimode fiber. Bandwidth of the fiber may be used to compare with an optimal bandwidth to determine discrepancy in length of the fiber optic network. The modal dispersion measurement system may be used for real-time monitoring of cable length status, e.g., to determine presence of cable faults.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, modal dispersion measurement in a bi-directional dual-multimode fiber optic network is described. It is understood that the methods and systems described herein may be applied in all dual-fiber optical networks. The illustrative techniques may be used with any suitable data processing configuration and with any suitable servers, computers, and devices. In the claims, unless otherwise indicated the article "a" is to refer to "one or more than one".

What is claimed is:

1. A computer system comprising:
a computer processor; and
logic instructions on tangible computer readable media and executable by the computer processor to cause the computer processor to:
receive a first pulse width of a first pulse;
receive a second pulse width of a second pulse, the second pulse width being indicative of a modal dispersion;
compute a distortion error due to the modal dispersion based on a difference between a quantity based on the first pulse width and a quantity based on the second pulse width, wherein the difference is equal to the quantity based on the first pulse width minus the quantity based on the second pulse width.

2. The system of claim 1, the logic instructions further causing the computer processor to:
configure the first pulse and the second pulse to conform to a common structure and format for communicating over a bi-directional dual-multimode fiber optic network (BDON), the BDON causing the modal dispersion.

3. The system of claim 2, the logic instructions further causing the computer processor to:
communicate the first pulse in a first direction over the BDON; and
communicate the second pulse in a direction opposite to the first direction.

4. The system of claim 2, the logic instructions further causing the computer processor to:
measure the first pulse width and the second pulse width on one end of the BDON, the measuring being performed concurrently with the BDON communicating live data as a bitstream, wherein the first pulse width is a transmitted pulse width and the second pulse width is a received pulse width.

5. The system of claim 2, the logic instructions further causing the computer processor to:
measure the first pulse width on one end of the BDON and the second pulse width on another end of the BDON opposite to the one end, the measuring being performed while the BDON communicates live data as a bitstream, wherein the first pulse width is a transmitted pulse width and the second pulse width is a received pulse width.

6. The system of claim 5, the logic instructions further causing the computer processor to:
configure the bitstream as a programmable bit stream.

7. The system of claim 6, the logic instructions further causing the computer processor to:
store the programmable bit stream in a memory for computing the distortion error.

8. The system of claim 2, the logic instructions further causing the computer processor to:
configure the BDON to communicate asynchronously.

9. The system of claim 2, the logic instructions further causing the computer processor to:
compute a bandwidth (BW) of the BDON, the BW being inversely proportional to the distortion error;
compute an optimal bandwidth (OBW) of the bandwidth as a function of a maximum length and a bit rate of the BDON; and
compare the BW to the OBW to determine if a length of the BDON exceeds the maximum length.

10. The system of claim 9, the logic instructions further causing the computer processor to:
store two consecutive BW values of the BDON; and
detect a fault in at least one channel of the BDON if a difference between the two consecutive BW values is greater than a threshold value.

11. The system of claim 2, the logic instructions further causing the computer processor to:
select the first pulse at a start of a communication frame being communicated in a first direction over the BDON;
measure the first pulse width by measuring a time difference between a trailing edge and a leading edge of the first pulse;
select the second pulse at a start of another communication frame being communicated in a direction that is opposite to the first direction over the BDON; and
measure the second pulse width by measuring a time difference between a trailing edge and a leading edge of the second pulse.

12. The system of claim 2, the logic instructions further causing the computer processor to:
monitor the modal dispersion occurring concurrently with bi-directional communication data flowing through the BDON.

13. The system of claim 1, the logic instructions further causing the computer processor to validate a communication network based on the distortion error.

14. The system of claim 1, the logic instructions further causing the computer processor to:
compute the distortion error due to the modal dispersion by calculating a square root of the difference between the quantity based on the first pulse width and the quantity based on the second pulse width.

15. The system of claim 14, wherein the quantity based on the first pulse width comprises a square of the first pulse width.

16. The system of claim 14, wherein the quantity based on the second pulse width comprises a square of the second pulse width.

17. A computer system comprising:
a computer processor; and
logic instructions on tangible computer readable media and executable by the computer processor to cause the computer processor to:
receive a first pulse width of a first pulse;
receive a second pulse width of a second pulse, the second pulse width being indicative of a modal dispersion;
compute a distortion error due to the modal dispersion by calculating a square root of a difference between a square of the second pulse width and a square of the first pulse width.

18. A method comprising:
receiving a first pulse width of a first pulse being communicated over a bi-directional dual-multimode fiber optic network (BDON);
receiving a second pulse width of a second pulse being communicated over the BDON, the second pulse width being indicative of a modal dispersion in the BDON; and
computing a distortion error due to the modal dispersion based on a difference between a quantity based on the first pulse width and a quantity based on the second pulse width, wherein the difference is equal to the quantity based on the first pulse width minus the quantity based on the second pulse width.

19. The method of claim 18, further comprising:
validating the BDON based on the distortion error.

20. The method of claim 18, wherein computing the distortion error due to the modal dispersion comprises calculating a square root of the difference between the quantity based on the first pulse width and the quantity based on the second pulse width.

21. A system comprising:
- a transmitter and receiver circuit operable to communicate signals;
- a memory;
- a first trigger circuit and a second trigger circuit;
- a transmit timer and a receive timer; and
- a microprocessor coupled to the memory to store data, the microprocessor configured to load qualifier values in the first and second trigger circuits, compare the qualifier values to a received bit flow, send an interrupt signal and enable the transmit and receive timers when Start of Frame bits are detected, measure pulse width for transmit and receive signals using a pulse signal that occurs after a qualifier value is received, and determine a distortion error due to modal dispersion based on a difference between a quantity based on the received pulse width and a quantity based on the transmitted pulse width, wherein the difference is equal to the quantity based on the received pulse width minus the quantity based on the transmitted pulse width.

22. The system of claim 21, the microprocessor further configured to validate a communication network based on the distortion error.

23. The system of claim 21, the microprocessor further configured to:
- determine the distortion error due to the modal dispersion by calculating a square root of the difference between the quantity based on the first pulse width and the quantity based on the second pulse width.

* * * * *

UNITED STATES PATENT AND TRADEMARK OFFICE
CERTIFICATE OF CORRECTION

PATENT NO. : 8,588,607 B2  
APPLICATION NO. : 12/362484  
DATED : November 19, 2013  
INVENTOR(S) : Oladeji Bamidele Akanbi et al.

Page 1 of 1

It is certified that error appears in the above-identified patent and that said Letters Patent is hereby corrected as shown below:

In the Specifications

In column 4, lines 41-49, delete "An amplitude of the first pulse 220 may vary in dependence of an angle of reflection with the amplitude being the highest for a signal path aligned with the axis of the optical fiber core. The second pulse 230 is shown to include 3 component pulses received from 3 paths resulting in a composite pulse having a pulse width equal to the second pulse width 232. It is understood that a number of component pulses present in the second pulse 230 may depend on various factors such as a diameter of the core of the optical fiber." and
insert -- The first transceiver 132 and the second transceiver 136 may be used to implement the measurement of the modal dispersion that may be present in the BDON 134. The measurement is performed concurrently with the BDON 134 communicating live or on-line data as a bitstream. That is, monitoring of the modal dispersion occurs concurrently with the bi-directional communication data flowing through the BDON 134. A first pulse 220 of a bit stream having a first pulse width 222 is provided to the first end of 162 of the BDON 134 and the same pulse, e.g., the first pulse 220, is then received at the second end 164 as a second pulse 230 having a second pulse width 232. Similarly, the first pulse 220 of a bit stream having the first pulse width 222 is provided to the second end of 164 of the BDON 134 and is received at the first end 162 as the second pulse 230 having the second pulse width 232. The first pulse width 222 and the second pulse width 232 may be measured by subtracting a time of occurrence of a trailing edge of a pulse from a time of occurrence of a leading edge of the pulse. --, therefor.

In column 4, line 59, delete "210" and insert -- 220 --, therefor.

Signed and Sealed this  
Eleventh Day of March, 2014

Michelle K. Lee  
*Deputy Director of the United States Patent and Trademark Office*